No. 776,815. PATENTED DEC. 6, 1904.
C. A. SULLIVAN, P. J. SWEENEY & E. J. WOODISON.
VENTILATOR ATTACHMENT FOR WATER CLOSET BOWLS.
APPLICATION FILED SEPT. 13, 1902.
NO MODEL. 2 SHEETS—SHEET 1.
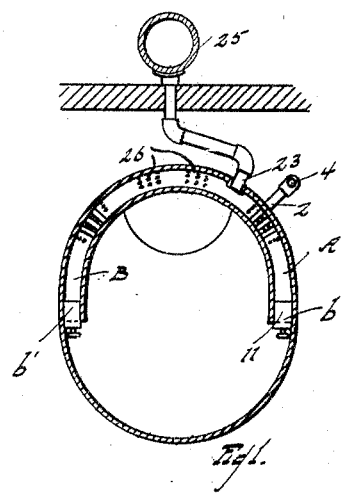
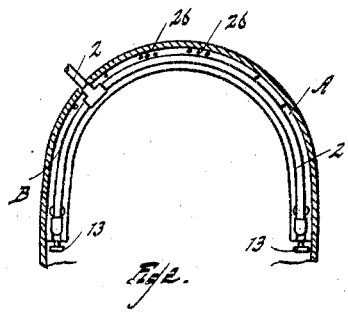
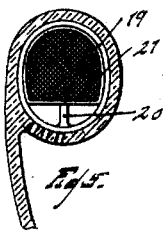
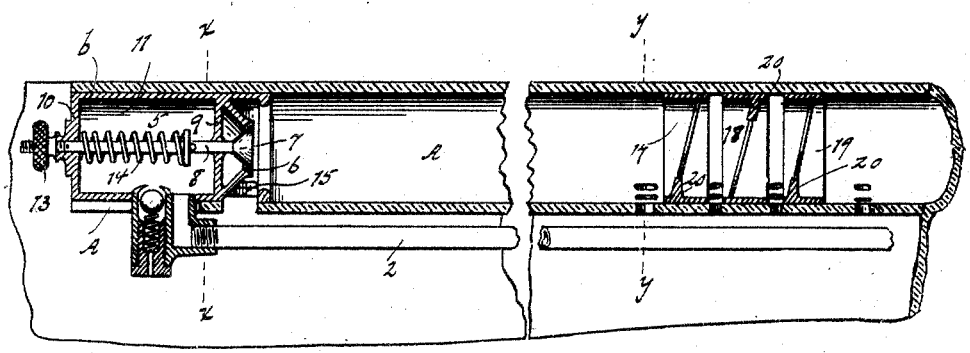
WITNESSES
INVENTORS
Charles A. Sullivan
Peter J. Sweeney
Edward J. Woodison
By Parker & Burton Attorneys.

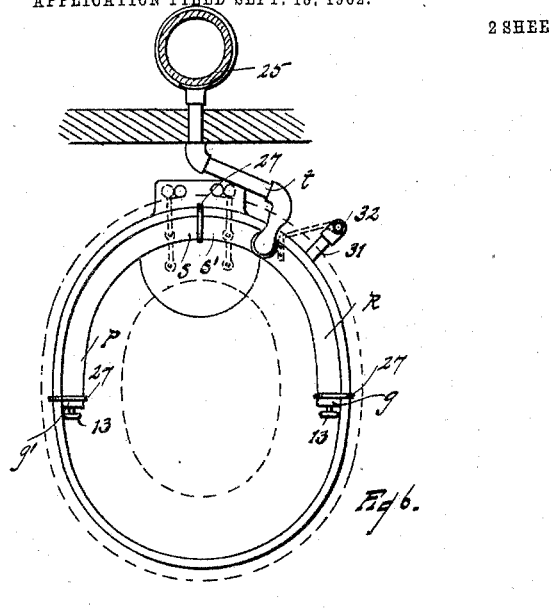
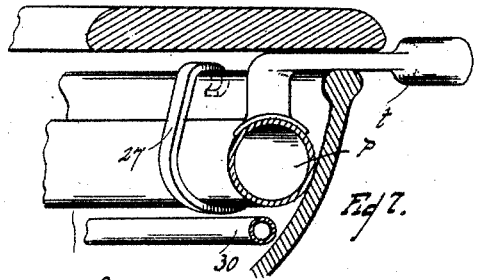
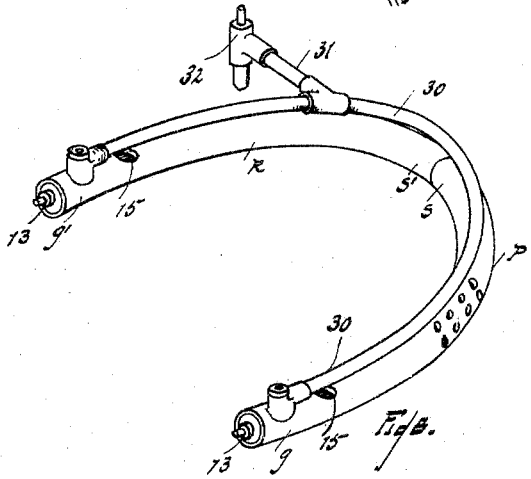

No. 776,815. Patented December 6, 1904.

UNITED STATES PATENT OFFICE.

CHARLES A. SULLIVAN AND PETER J. SWEENEY, OF WINDSOR, CANADA, AND EDWARD J. WOODISON, OF DETROIT, MICHIGAN.

VENTILATOR ATTACHMENT FOR WATER-CLOSET BOWLS.

SPECIFICATION forming part of Letters Patent No. 776,815, dated December 6, 1904.

Application filed September 13, 1902. Serial No. 123,214. (No model.)

*To all whom it may concern:*

Be it known that we, CHARLES A. SULLIVAN and PETER J. SWEENEY, residing at Windsor, in the county of Essex, Province of Ontario, Canada, and EDWARD J. WOODISON, residing at Detroit, county of Wayne, State of Michigan, citizens of the United States, have invented a certain new and useful Improvement in Ventilating Attachments for Water-Closet Bowls; and we declare the following to be a full, clear, and exact description of the invention, such as will enable others skilled in the art to which it pertains to make and use the same, reference being had to the accompanying drawings, which form a part of this specification.

This invention relates to ventilators, and has for its object an improved ventilating attachment to be used with the bowls of water-closets.

In the drawings, Figure 1 is a plan view of the ventilator made integral to the bowl. Fig. 2 is a view looking upward toward the under side. Fig. 3 is a vertical longitudinal section of one end of the ventilator. Fig. 4 is a cross-section at the line $x$ $x$ of Fig. 3. Fig. 5 is a cross-section at the line $y$ $y$ of Fig. 3. Fig. 6 shows a detachable ventilator. Fig. 7 is a perspective showing the air-discharge pipe employed with a detachable ventilator. Fig. 8 is a perspective showing the detachable ventilator in reversed position.

For structural reasons the detachable ventilator is made in two parts P and R. Each part consists of a curved or bent tube of about a quadrant with the end $g$ (or $g'$) provided with an adjustable spray-controller and the ends $s$ $s'$ arranged to telescope or engage one within the other. A discharge-pipe $t$ is attached to one of the parts.

30 indicates a water-supply pipe curved to correspond with the two sections P and R of the spray-pipe connected with a source of water-supply by feed-pipe 31, in which there is a valve 32, arranged to be actuated by the seat. One branch of the water-supply pipe 30 terminates under the end $g$ of the spray-pipe and the other branch terminates under the end $g'$. In each case it leads into a chamber which is similar in function to the chamber of the fixed ventilator particularly hereinafter described. The air-outlet from the chamber is through a pipe $t$, that leads to the ventilator-pipe 25.

The fixed attachment has a chamber constructed in the material of which the bowl is made. The ends are open for the insertion of nozzle-holders $b$ $b'$, and into these nozzle-holders lead the terminals from water-supply pipe 2, that connects with a source of water-supply through a pipe in which there is a seat-actuated valve 4.

The nozzle-holder $b$ comprises a casing 11, in which spray-valve 7 engages in an orifice 6 and is provided with a stem 8, which passes through a guide bar or spider 9 and also passes through the end closure 10 of a casing 11. The casing 11 engages closely within the end of the chamber and itself contains a chamber and is held in place in any suitable way—as, for example, by inserting the end of the water-supply pipe 2 through the walls of the chamber in the casing 11. The end of the stem 8 projects beyond the end 10 of the casing and is threaded and provided with an adjusting-nut 13, and a spring 14 is arranged to hold the valve 7 in proper position with respect to the orifice 6.

The valve 7 does not seat on the walls of the orifice, but is capable of adjustment to close down the annular opening between the valve and the walls of the orifice to an extremely thin line, or it may be adjusted to increase the annular opening by turning the thumb-nut 13 and moving the valve to the proper adjustment. In case of obstruction to the orifice by the gathering of solid material in the thin opening the valve may be drawn back forcibly at any time against tension of spring 14, and the water will at once cleanse the edges of the valve and the orifice. Water entering the chamber 5 passes through the thin opening between the valve 7 and the walls of the orifice 6 in a thin stream or spray, which spreads as the distance from the orifice increases and carries with it air drawn in by siphoning action through openings 15 and 16 in the walls of the spay-chamber.

In the spray-chamber about midway between the ends A and B are interposed a number of baffle-screens 17 18 19. Each screen consists of a plate 20, that extends partially across the spray-chamber, and a screen 21, that extends the remainder of the distance across the chamber. Between the baffle-plates and on the spray side of them are small openings through the under side of the walls of the spray-chamber for the discharge of water into the bowl underneath the spray-chamber.

The air after passing the baffle-plates is allowed to have egress from the spray-chamber through a pipe 23 and connects by ordinary piping to exhaust-pipe 25.

There need be only one exit-pipe to the two spray-chambers. At the rear of the spray-chamber there are outlet-holes opening downward, (shown at 26 in Fig. 2,) which furnish outlet for any water that may have traveled thus far.

The detachable attachment can be located wholly within the bowl, where it is practically out of sight, having no external connections except the pipe leading to the exhaust and the small water-pipe leading into the bowl. It is held in place by hangers 27, that are simple hooks engaging over the edge of the bowl and under the attachment at proper places to sustain it in its position.

What we claim is—

1. A ventilator for closet-bowls comprising a spray-chamber arranged to empty directly into the bowl, water and air connections, and means interposed between the spray and the exit for impeding the free passage of water along the spray-chamber, substantially as described.

2. A ventilating attachment for closet-bowls, comprising a spray-chamber, provided with a plurality of openings along its length arranged to empty directly into the bowl, water and air connections, means for impeding the free travel of the water along the chamber, and means for hanging the spray-chamber inside the closet-bowl, substantially as described.

3. In a ventilating attachment for closet-bowls, the combination of a bent pipe provided with spray-water-inlet openings at each end, air-inlet openings near each end, and water-outlet openings opening downward intermediate the ends, substantially as described.

4. In a ventilating attachment for water-closets, the combination of a spray-chamber provided with openings for the outflow of water therefrom arranged at intervals along the floor of the chamber, a spray-nozzle at the end thereof, means for adjusting the spray-nozzle, substantially as described.

In testimony whereof we sign this specification in the presence of two witnesses.

CHARLES A. SULLIVAN.
PETER J. SWEENEY.
EDWARD J. WOODISON.

Witnesses:
CHARLES F. BURTON,
MAY E. KOTT.